United States Patent
Rocci et al.

(10) Patent No.: US 11,295,560 B2
(45) Date of Patent: Apr. 5, 2022

(54) CLOUD-MANAGED VALIDATION AND EXECUTION FOR DIAGNOSTIC REQUESTS

(71) Applicant: FORD GLOBAL TECHNOLOGIES, LLC, Dearborn, MI (US)

(72) Inventors: Benjamin M. Rocci, Ann Arbor, MI (US); Mark Anthony Rockwell, Royal Oak, MI (US); Christian Krozal, South Lyon, MI (US); David Randolph Roberts, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 16/052,069

(22) Filed: Aug. 1, 2018

(65) Prior Publication Data

US 2020/0043256 A1 Feb. 6, 2020

(51) Int. Cl.
*G07C 5/08* (2006.01)
*G07C 5/00* (2006.01)
*G06F 9/455* (2018.01)

(52) U.S. Cl.
CPC .......... *G07C 5/0808* (2013.01); *G06F 9/455* (2013.01); *G07C 5/008* (2013.01)

(58) Field of Classification Search
CPC ........ G07C 5/0808; G07C 5/008; G06F 9/455
USPC .................................................. 701/29, 29.3
See application file for complete search history.

(56) References Cited

U.S. PATENT DOCUMENTS

| 2005/0065678 | A1* | 3/2005 | Smith ................... G06Q 10/00 701/31.4 |
| 2010/0324376 | A1* | 12/2010 | Chinnadurai .......... G06Q 50/22 600/300 |
| 2015/0081161 | A1 | 3/2015 | Chapman et al. |
| 2015/0094903 | A1* | 4/2015 | Bell ..................... G07C 5/0808 701/31.4 |
| 2016/0269557 | A1* | 9/2016 | Daye ................... H04M 3/5233 |
| 2018/0075538 | A1* | 3/2018 | Konrardy ............... G06Q 40/08 |
| 2018/0151003 | A1* | 5/2018 | Grobler ............... G06F 11/2294 |

FOREIGN PATENT DOCUMENTS

| CN | 104965507 A | * 10/2015 |
| CN | 105573296 A | * 5/2016 |
| CN | 105573296 A | 5/2016 |
| CN | 106053098 A | 10/2016 |

OTHER PUBLICATIONS

NPL English translation of Ziyan (CN-105573296-A) (Year: 2016).*
NPL English translation of Zhaoming (CN-104965507-A). (Year: 2015).*

* cited by examiner

*Primary Examiner* — Geepy Pe
*Assistant Examiner* — Bakari Underwood
(74) *Attorney, Agent, or Firm* — Michael J. Spenner; Brooks Kushman P.C.

(57) ABSTRACT

A system includes a test environment and a processor. The processor is programmed to perform, on the test environment, a diagnostic request specifying a plurality of elements of information, responsive to receipt of a successful result of the diagnostic request from the test environment within a predefined timeout period, approve the diagnostic request for execution by fleet vehicles, and otherwise, retest the diagnostic request as a plurality of requests.

19 Claims, 4 Drawing Sheets

CLOUD-MANAGED VALIDATION AND EXECUTION FOR DIAGNOSTIC REQUESTS

TECHNICAL FIELD

Aspects of the disclosure generally relate to cloud-managed validation and execution for diagnostic requests.

BACKGROUND

Automobile diagnostic data, such as Diagnostic Trouble Codes (DTCs), form compact, informative messages. Diagnostic data was designed to allow vehicle controllers to indicate a system fault and/or a need for repair.

SUMMARY

In one or more illustrative examples, a system includes a test environment and a processor. The processor is programmed to perform, on the test environment, a diagnostic request specifying a plurality of elements of information, responsive to receipt of a successful result of the diagnostic request from the test environment within a predefined timeout period, approve the diagnostic request for execution by fleet vehicles, and otherwise, retest the diagnostic request as a plurality of requests.

In one or more illustrative examples, a method includes dividing a received diagnostic request for a plurality of diagnostic codes into a plurality of diagnostic requests each for a single diagnostic code; performing, on a test environment, the plurality of diagnostic requests to provide diagnostic data; and responsive to receipt of a successful result of the plurality of diagnostic requests from the test environment within a predefined timeout period, approving the plurality of diagnostic requests for execution by fleet vehicles.

In one or more illustrative examples, a non-transitory computer-readable medium comprising instructions that, when executed by a processor, cause the processor to divide a single diagnostic requirement for a plurality of diagnostic codes into a plurality of diagnostic requests each for a single diagnostic code; perform, on a test environment, the plurality of diagnostic requests to provide diagnostic data; and responsive to receipt of a successful result of the plurality of diagnostic requests from the test environment within predefined success parameters, approve the plurality of diagnostic requests for execution by fleet vehicles.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may be configured to receive and process requests for certain diagnostics via an embedded modem of the vehicle. However, some combinations of diagnostic requests to certain vehicle controllers can result in temporary loss of controller function. Depending on the controller and the time at which the diagnostic request occurs, the loss of controller function can cause significant customer-noticeable issues. Yet, it can be challenging to identify or otherwise predict what combinations of diagnostic requests to what controller may result in this issue.

A vehicle data server can be utilized to automate validation of embedded-modem diagnostic requests prior to execution of the requests by vehicles. The vehicle data server may receive a diagnostic request from a survey device via the request portal. Responsive to receipt of the diagnostic request, the vehicle data server may process the request via a cloud based manager, which executes the request in a hardware-in-the-loop (HIL) environment or other simulated environment. The cloud manager will wait for the response and, once available, evaluate it for proper structure and content. If the response has been validated, the diagnostic request will be released to the public fleet for execution. If the response times out or is found invalid, the diagnostic request will be cancelled and the operator will be notified.

The vehicle data server may be further configured to break the diagnostic request up into component data requests, such that each component data request does not execute until the response from the previous request is received and validated (instead of all data requests executing at once). If this method is effective for the full diagnostic request, then the vehicle data server may release the request in this form (a series of individual requests spaced in time rather than a packaged request).

Figure 1:
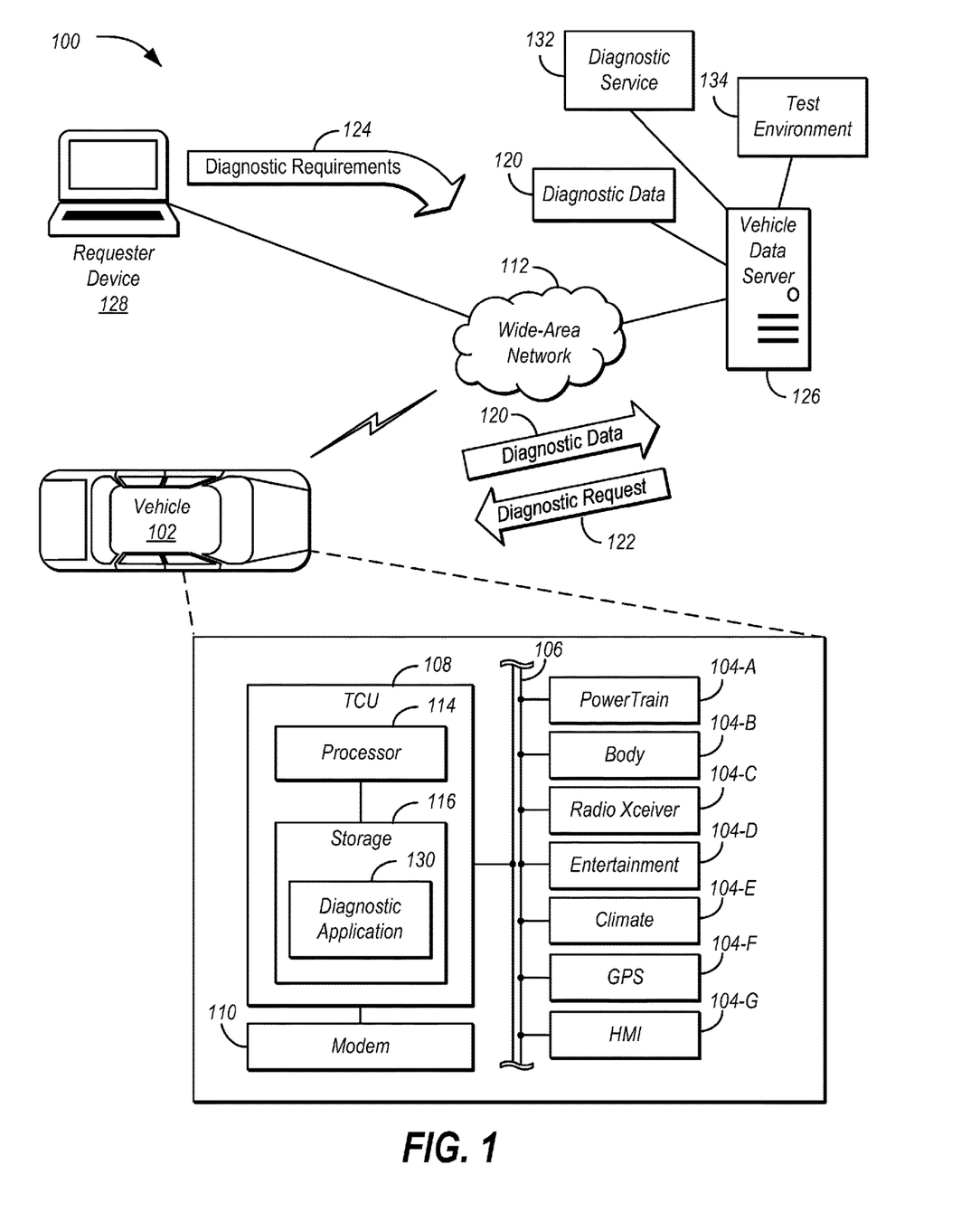
FIG. 1 illustrates an example system implementing cloud-managed validation and execution for diagnostic requests.

FIG. 1 illustrates an example system 100 implementing cloud-managed validation and execution for diagnostic requests 122. As illustrated, a vehicle 102 includes a plurality of vehicle controllers 104 in communication over one or more vehicle buses 106. The system 100 also includes a vehicle data server 126 configured to maintain diagnostic data 120 received from various vehicles 102. The vehicle 102 further includes a telematics control unit (TCU) 108 configured to send diagnostic data 120, including diagnostic information, to the vehicle data server 126. The TCU 108 may utilize a diagnostic application 130 installed to the TCU 108 to send a regular cadence of diagnostic data 120 as well as to send triggered diagnostic data 120 responsive to trigger criteria having been met. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle electronic control units (ECUs) 104, as well as between the TCU 108 and the vehicle ECUs 104. As some non-limiting examples, the vehicle bus 106 may include one or more of a vehicle controller area network (CAN), an Ethernet network, and a media oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, and a telephone network, as some non-limiting examples. As another example, the TCU 108 may utilize one or more of BLUETOOTH, Wi-Fi, or wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle ECUs 104 connected to the one or more vehicle buses 106. This collected information may be referred to as diagnostic data 120. The TCU 108 may store the collected diagnostic data 120 to the storage 116 of the TCU 108 or, in other examples, to other storage in communication with the TCU 108. The vehicle information retrieved by the TCU 108 may include, as some non-limiting examples, accelerator pedal position, steering wheel angle, vehicle speed, vehicle location (e.g., GPS coordinates, etc.), vehicle unique identifier (e.g., VIN), engine revolutions per minute (RPM), and vehicle HMI information, such as steering wheel button press information. Thus, diagnostic data 120 may include collected DTC information and/or other vehicle information stored to the storage 116 of the TCU 108.

The diagnostic request 122 includes information defining diagnostic codes or other information to be captured from the vehicles 102. The diagnostic request 122 may be sent to the vehicle 102, and the vehicle 102 may return the diagnostic data 120 in response. Diagnostic requirements 124 may be used to define the diagnostic codes or other information that is specified in the diagnostic request 122. The diagnostic requirements 124 may further specify attributes of the vehicles 102 that should receive the diagnostic request 122. In an example, these attributes may include one or more of: a make of a vehicle 102, a model of a vehicle 102, a model year of a vehicle 102, a vehicle identification number (VIN) of a vehicle 102, or a VIN range of vehicle 102.

The vehicle data server 126 and a requester device 128 may each include various types of computing apparatus, such as a computer workstation, a server, a desktop computer, a virtual server instance executed by a mainframe server, or some other computing system and/or device. Similar to the TCU 108, the vehicle data server 126 and the requester device 128 generally include a memory on which computer-executable instructions may be maintained, where the instructions may be executable by one or more processors (not shown for clarity). Such instructions and other data may be stored using a variety of computer-readable media. In an example, the vehicle data server 126 may be configured to maintain the diagnostic data 120 received from the TCU 108 of the vehicles 102 by way of the network 112.

The requester device 128 may be used to allow an operator to configure the diagnostic requirements 124 that are used by the vehicle data server 126 to send the diagnostic requests 122. In an example, a user of the requester device 128 may specify one or more diagnostic codes to be captured from a set of vehicles 102. The user may also specify what vehicles 102 are intended to receive the diagnostic requests 122 (e.g., make, model, VIN range, etc.).

The diagnostic application 130 may be one application included on the storage 116 of the TCU 108. The diagnostic application 130 may include instructions that, when executed by the processor 114 of the TCU 108, cause the TCU 108 to periodically collect the diagnostic data 120 information from the controllers 104 (e.g., including DTC information), store the information for transmission, and transmit the diagnostic data 120 to the vehicle data server 126 over the wide-area network 112. The diagnostic application 130 may also include instructions for performing functions in response to receipt of diagnostic requests 122 from the vehicle data server 126.

A test environment 134 may include various apparatus configured to execute diagnostic requests 122 for testing, before providing the diagnostic requests 122 to vehicles 102. In an example, the test environment 134 may include a software simulation of the controllers 104 and buses 106 of a vehicle 102. In another example, the test environment 134 may include a hardware setup of the controllers 104 and buses 106 of a vehicle 102. In yet a further example, the test environment 134 may include one or more vehicles 102 specifically purposed for executing tests of diagnostic requests 122.

A diagnostic service 132 may be one application included on the storage of the vehicle data server 126. The diagnostic service 132 may include instructions that, when executed by the processor of the vehicle data server 126, cause the vehicle data server 126 to receive the diagnostic data 120 information from vehicles 102, receive diagnostic requirements 124 from the requester device 128, utilize the test environment 134 to test diagnostic requests 122 generated based on the diagnostic requirements 124, convert the diagnostic requirements 124 into diagnostic requests 122 based on the testing, and provide diagnostic requests 122 to the vehicles 102.

Regarding the utilization of the test environment 134, the diagnostic service 132 may send a test diagnostic request 122 to the test environment 134, wait for a response and, once available, evaluate it for proper structure and content. If the response has been validated, the diagnostic request 122 may be released to the public fleet for execution. If the response times out or is found invalid, the diagnostic request 122 may be cancelled and the requester device 128 may be notified.

When performing a test, the diagnostic service 132 may also break up diagnostic request 122 into individual data requests such that each request will not execute until the response from the previous request is received and validated. For instance, if a test diagnostic request 122 fails as a combined request, this incremental approach may be done instead of sending a diagnostic request 122 that includes multiple data requests to be executed at once. The diagnostic service 132 may then compile the overall results from the multiple individual requests. If this method is effective for the full diagnostic request, then the diagnostic service 132 may release the diagnostic request 122 for processing by the vehicles 102 in the form of the individual requests.

Figure 2:
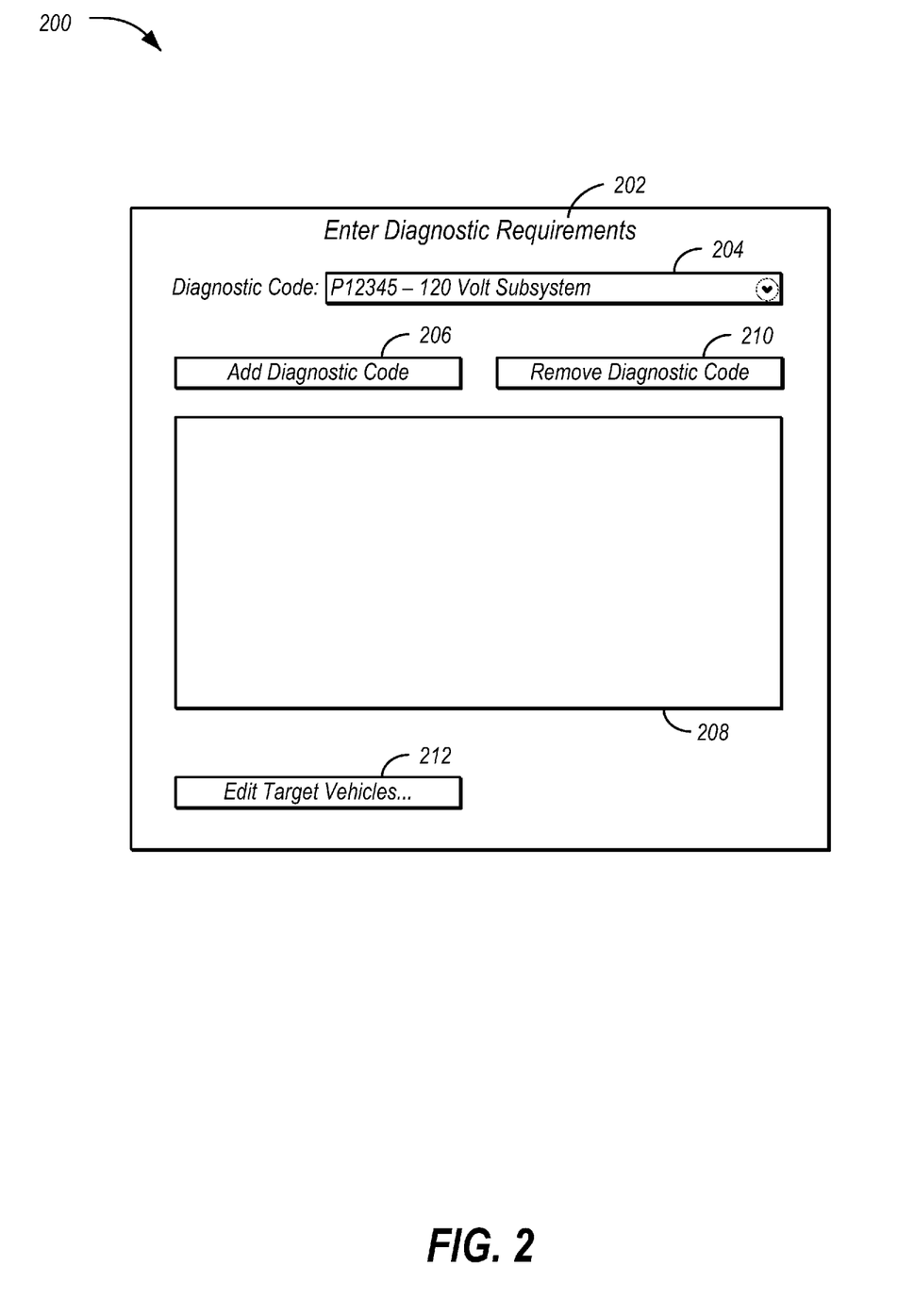
FIG. 2 illustrates an example of a user interface of the requester device for entering diagnostic requirements.

FIG. 2 illustrates an example of a user interface 200 of the requester device 128 for entering diagnostic requirements 124. In an example, the user interface 200 may be a web page rendered by a web browser of the requester device 128, e.g., by the diagnostic service 132. In another example, the requester device 128 may execute a client application configured to communicate over the wide-area network 112 with the diagnostic service 132.

As shown, the user interface 200 includes a label 202 indicating the user interface 200 is for entering of diagnostic requirements 124. The user interface 200 also includes a diagnostic code control 204 from which a user may select a diagnostic code for inclusion in the diagnostic requirements 124. The example diagnostic code control 204 is a dropdown list, but other controls may be used from which one or more diagnostic codes can be entered or selected.

Once the user has selected a diagnostic code for inclusion, the user may press the add diagnostic code control 206 to add the diagnostic code to the diagnostic requirements 124. The user interface 200 also includes a diagnostic requirements list control 208 that includes a listing of the diagnostics that are included in the diagnostic requirements 124 that are being configured. The user may also remove diagnostics from the diagnostic requirements 124 by selecting a requirement from the diagnostic requirements list control 208 and selecting the remove diagnostics code control 210.

An edit target vehicles control 212 may be selected to receive selection of criteria for vehicles 102 to receive diagnostic requests 122 based on the diagnostic requirements 124. As some possibilities, the criteria may be that vehicles 102 of a certain make and model should be provided the diagnostic request 122, and/or that only vehicles 102 with certain VINs or a range of VINs should be provided the diagnostic request 122.

Figure 3:
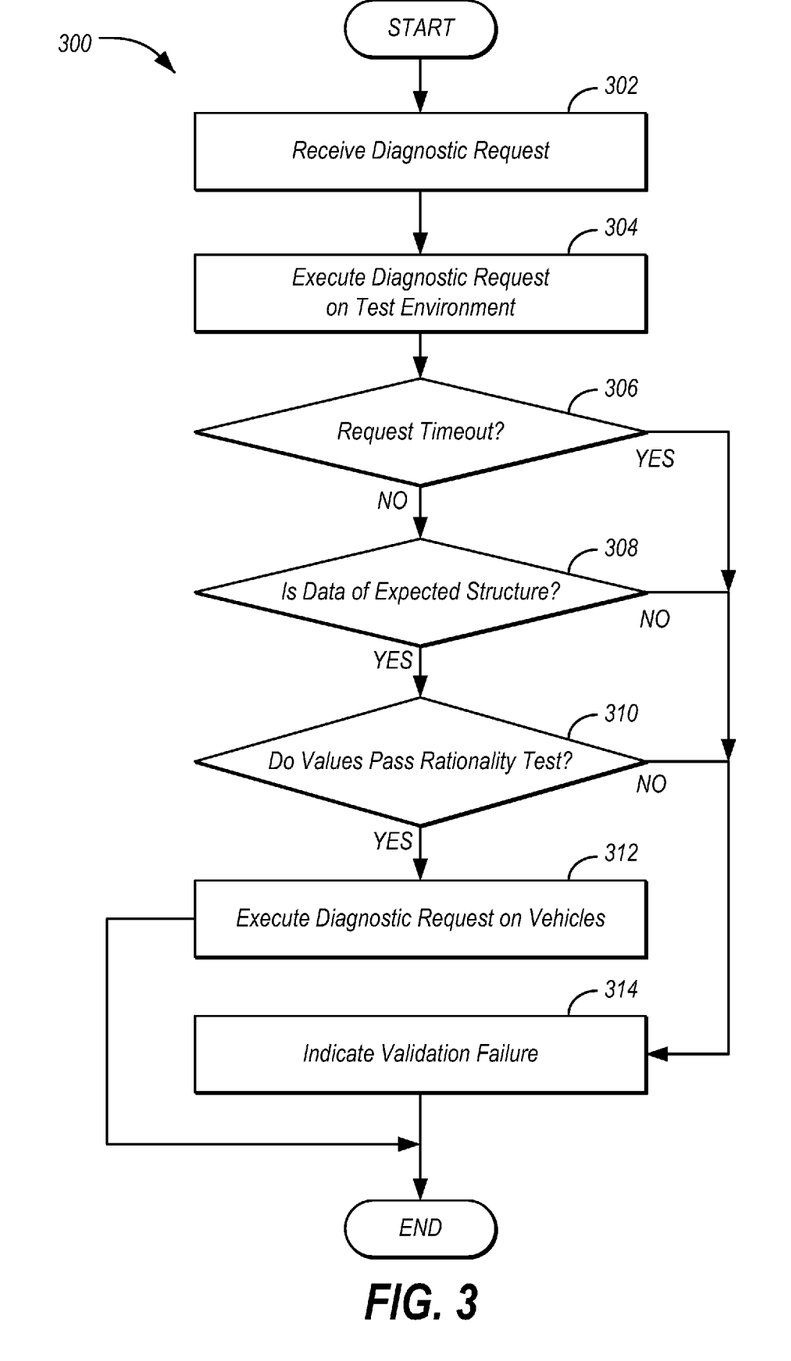
FIG. 3 illustrates an example process for implementing cloud-managed validation and execution for diagnostic requests.

FIG. 3 illustrates an example process 300 for implementing cloud-managed validation and execution for diagnostic requests 122. In an example, the process 300 may be performed by the vehicle data server 126 of the system 100.

At 302, the vehicle data server 126 receives a diagnostic request 122. In an example, the vehicle data server 126 receives diagnostic requirements 124 from the requester device 128 over the wide-area network 112. The diagnostic requirements 124 may specify one or more diagnostic codes to be retrieved from a set of vehicles 102 in one or more diagnostic requests 122.

At operation 304, the vehicle data server 126 executes the diagnostic request 122 on the test environment 134. In an example, the vehicle data server 126 sends the diagnostic request 122 to the test environment 134. The test environment 134 may include one or more of a software simulation of the controllers 104 and buses 106 of a vehicle 102, a hardware setup of the controllers 104 and buses 106 of a vehicle 102, or one or more vehicles 102 specifically purposed for executing tests of diagnostic requests 122. By executing the diagnostic request 122 using the test environment 134, the vehicle data server 126 can identify whether there may be any issues with the combination of requests to the controllers 104 specified in the diagnostic requests 122.

At 306, the vehicle data server 126 determines whether the execution of the diagnostic request 122 timed out. In an example, the vehicle data server 126 initiates a timer at operation 304, and determines whether a response from the test environment 134 is received within a predetermined amount of time from initiation of the timer. The predetermined amount of time may be set to an amount of time deemed acceptable for a vehicle 102 to process a diagnostic request 122, such as one second, five seconds, or twenty seconds, as some examples. If a result including diagnostic data 120 is received within the predetermined period of time, control passes to operation 308. Otherwise, control passes to operation 314.

The vehicle data server 126 determines, at 308, whether resulting diagnostic data 120 from the execution of the diagnostic request 122 conforms to an expected data structure. In an example, the vehicle data server 126 may validate the result diagnostic data 120 against a data schema or other model of an expected data format (e.g., the result is valid JSON or XML). If the resulting diagnostic data 120 conforms to the expected data structure, control passes to operation 310. Otherwise, control passes to operation 314.

At 310, the vehicle data server 126 determines whether the result diagnostic data 120 of the execution of the diagnostic request 122 passes a rationality test. In an example, the vehicle data server 126 may validate the range of values in the result diagnostic data 120 to ensure that data values of the diagnostic data 120 meet with definitions of the underlying data. For instance, if a value is bounded within a numerical range, then the vehicle data server 126 may ensure that the value in the result diagnostic data 120 is within that range. If the result diagnostic data 120 passes the rationality test, control passes to operation 312. Otherwise, control passes to operation 314.

The vehicle data server 126 executes the diagnostic request(s) 122 on vehicles 102 at 312. In an example, the vehicle data server 126 sends diagnostic requests 122 to the vehicles 102 specified by the diagnostic requirements 124. After operation 312, the process 300 ends.

At 314, the vehicle data server 126 indicates a validation failure of the diagnostic request 122. In an example, the vehicle data server 126 may send a response to the requester device 128 over the wide-area network 112 indicating that the diagnostic requirements 124 cannot be performed by the vehicles 102. The response may further include information indicative of the failure, such as that a timeout occurred, that the data was not of the expected structure, or that the values in the data failed to pass rationality testing. After operation 314, the process 300 ends.

Figure 4:
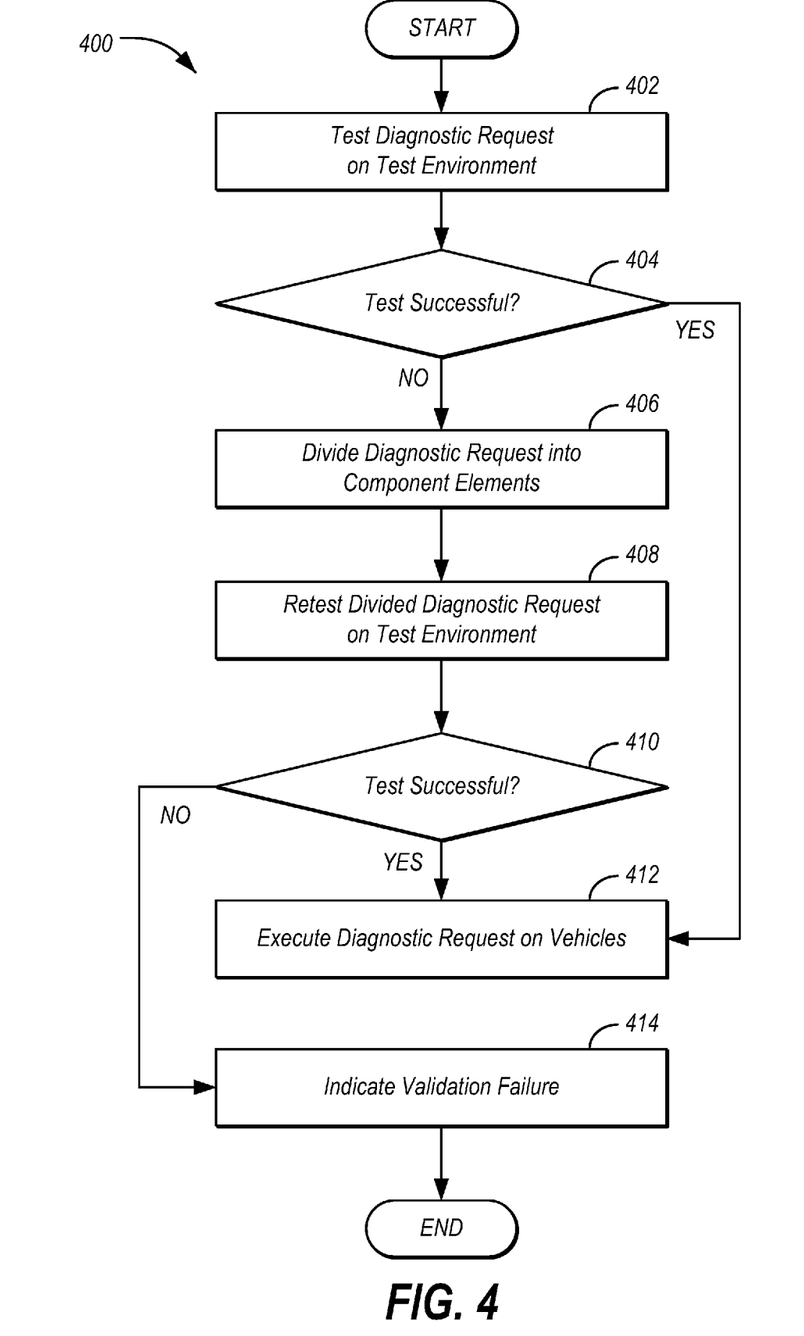
FIG. 4 illustrates an example process for implementing cloud-managed validation, execution, and division of diagnostic requests.

FIG. 4 illustrates an example process 400 for implementing cloud-managed validation, execution, and division of diagnostic requests 122. In an example, the process 400 may be performed by the vehicle data server 126 of the system 100.

At operation 402, similar to operation 304, the vehicle data server 126 tests a diagnostic request 122 on the test environment 134.

At 404, the vehicle data server 126 determines whether the test performed at operation 402 was successful. In an example, similar to as discussed above with respect to operations 306, 308, and 310, the vehicle data server 126 may verify that a result of the diagnostic request 122 was received within a predefined timeout period, is of an expected structure, and passes rationality testing. If the test was successful, control passes to operation 412. Otherwise, control passes to operation 406.

The vehicle data server 126 divides the diagnostic request 122 into component elements at 406. For instance, the diagnostic request 122 specifies a plurality of elements of information. For instance, the user may have added a plurality of diagnostic codes to the diagnostic requirements 124 using the user interface 200. In an example, the vehicle data server 126 separates each of the specified elements into its own separate diagnostic request 122. Each of the separate diagnostic requests 122 may then be executed by the vehicle 102 independently. In some cases, the vehicle data server 126 divides the diagnostic request 122 into an ordered sequence of separate diagnostic requests 122, such that the sequence is to be executed in a predefined order.

At 408, similar to operation 304, the vehicle data server 126 retests the divided diagnostic requests 122 on the test environment 134. In an example, the vehicle data server 126 sends each of the divided diagnostic requests 122 to the test environment 134 independently.

At operation 410, the vehicle data server 126 determines whether the test performed at operation 410 was successful. In an example, similar to as discussed above with respect to operations 306, 308, and 310, the vehicle data server 126 may verify that each result of the separated diagnostic requests 122 was received within a predefined timeout period, is of an expected structure, and passes rationality testing. If the tests were successful, control passes to operation 412. Otherwise, control passes to operation 414.

At 412, the vehicle data server 126 executes the diagnostic request 122 on vehicles 102 at 312. In an example, the vehicle data server 126 sends diagnostic requests 122 to the vehicles 102 specified by the diagnostic requirements 124. After operation 412, the process 300 ends.

The vehicle data server 126 indicates a validation failure of the diagnostic requirements 124 at 414. In an example, the vehicle data server 126 may send a response to the requester device 128 over the wide-area network 112 indicating that the diagnostic requirements 124 cannot be performed by the vehicles 102. The response may further include information indicative of the failure, such as that a timeout occurred, that the data was not of the expected structure, or that the values in the data failed to pass rationality testing. After operation 414, the process 400 ends.

Computing devices described herein, such as the TCU 108, vehicle data server 126, requester device 128, and test environment 134, generally include computer-executable instructions where the instructions may be executable by one or more computing devices such as those listed above. Computer-executable instructions, such as those of the diagnostic application 130, or diagnostic service 132, or test environment 134, may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a test environment; and
   a processor programmed to
      perform, on the test environment, a diagnostic request specifying a plurality of elements of information without dividing the diagnostic request into a plurality of diagnostic requests,
      responsive to receipt of a successful result of the diagnostic request from the test environment within a predefined timeout period, approve the diagnostic request for execution by fleet vehicles, and
      responsive to receipt of an unsuccessful result of the diagnostic request, divide the diagnostic request into the plurality of diagnostic requests each for one of the plurality of elements of information, retest the diagnostic request as a plurality of requests, and approve the diagnostic request for execution by the fleet vehicles responsive to receipt of a successful result of the retest of the diagnostic request as a plurality of requests.

2. The system of claim 1, wherein the processor is further programmed to, responsive to receipt of a successful result of the retested diagnostic request from the test environment within a second predefined timeout period, approve the diagnostic request as a plurality of requests for execution by the vehicles.

3. The system of claim 1, wherein the processor is further programmed to:
   receive diagnostic requirements from a requester device; and
   responsive to receipt of an unsuccessful result of the retested diagnostic request, send a notification to the requester device indicating rejection of the diagnostic requirements.

4. The system of claim 3, wherein the diagnostic requirements specify the vehicles as a set of vehicle identification numbers.

5. The system of claim 3, wherein the diagnostic requirements specify the vehicles as a make and model of vehicle.

6. The system of claim 1, wherein the processor is further programmed to validate diagnostic data received in response to the diagnostic request against a data schema of an expected data format to determine whether the diagnostic request had a successful result.

7. The system of claim 1, wherein the processor is further programmed to validate diagnostic data received in response to the diagnostic request to ensure that data values of the diagnostic data meet with definitions of data elements being requested by the diagnostic request.

8. The system of claim 7, wherein the processor is further programmed to receive the diagnostic data over a wide-area network from the vehicles.

9. The system of claim 1, wherein the test environment includes a software simulation of controllers and buses of a vehicle.

10. The system of claim 1, wherein the test environment includes a hardware setup of controllers and buses of a vehicle.

11. The system of claim 1, wherein the test environment includes one or more physical vehicles purposed for execution of tests of diagnostic requests.

12. A method comprising:
   performing, on a test environment, a single diagnostic requirement for a plurality of diagnostic codes;
   responsive to receipt of a successful result of the single diagnostic requirement from the test environment within a predefined timeout period, approving the single diagnostic requirement for execution by fleet vehicles; and
   responsive to receipt of an unsuccessful result of the single diagnostic requirement from the test environment,
      dividing the single diagnostic requirement for the plurality of diagnostic codes into a plurality of diagnostic requests each for a single one of the plurality of diagnostic codes,
      performing, on the test environment, the plurality of diagnostic requests to provide diagnostic data, and
      responsive to receipt of a successful result of the plurality of diagnostic requests from the test environment within a second predefined timeout period, approving the plurality of diagnostic requests for execution by the fleet vehicles.

13. The method of claim 12, further comprising:
   receiving the diagnostic requirement from a requester device; and
   responsive to receipt of an unsuccessful result of the plurality of diagnostic requests, sending a notification to the requester device indicating rejection of the diagnostic requirement.

14. The method of claim 12, further comprising validating the diagnostic data against a data schema of an expected data format and to ensure that data values of the diagnostic data meet with definitions of data elements being requested by the diagnostic request to determine whether the diagnostic request had a successful result.

15. The method of claim 12, wherein the test environment includes at least two of (i) a software simulation of controllers and buses of a vehicle, (ii) a hardware setup of controllers and buses of a vehicle, or (iii) one or more vehicles purposed for execution of tests of diagnostic requests.

16. A non-transitory computer-readable medium comprising instructions that, when executed by a processor, cause the processor to:
receive a single diagnostic request from a requester device, the single diagnostic request specifying a plurality of diagnostic codes;
perform, on a test environment, the single diagnostic request;
responsive to receipt of a successful result of the diagnostic request from the test environment within a first predefined timeout period, approve the single diagnostic request for execution by fleet vehicles;
responsive to receipt of an unsuccessful result of the diagnostic request from the test environment within the first predefined timeout period, divide the single diagnostic request into a plurality of diagnostic requests each for a single diagnostic code;
perform, on the test environment, the plurality of diagnostic requests to provide diagnostic data;
responsive to receipt of a successful result of the plurality of diagnostic requests from the test environment within predefined success parameters, approve the plurality of diagnostic requests for execution by fleet vehicles; and
responsive to receipt of an unsuccessful result of the plurality of diagnostic requests, sending a notification to the requester device indicating rejection of the single diagnostic request.

17. The medium of claim 16, wherein the predefined success parameters comprise validating the diagnostic data against a data schema of an expected data format and to ensure that data values of the diagnostic data meet with definitions of data elements being requested by the diagnostic request to determine whether the diagnostic request had a successful result.

18. The medium of claim 16, wherein the test environment includes at least two of (i) a software simulation of controllers and buses of a vehicle, (ii) a hardware setup of controllers and buses of a vehicle, or (iii) one or more vehicles purposed for execution of tests of diagnostic requests.

19. The medium of claim 16, wherein the predefined success parameters include receipt of the successful result within a second predefined timeout period.

* * * * *